(12) United States Patent
Cerv et al.

(10) Patent No.: US 11,821,596 B2
(45) Date of Patent: Nov. 21, 2023

(54) ELONGATE LIGHT

(71) Applicant: ZUMTOBEL LIGHTING GMBH, Dornbirn (AT)

(72) Inventors: Simon Cerv, Dornbirn (AT); Gerhard Galler, Bregenz (AT); Yannick Krampl, Dornbirn (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 69 days.

(21) Appl. No.: 17/608,772

(22) PCT Filed: Apr. 15, 2020

(86) PCT No.: PCT/EP2020/060546
§ 371 (c)(1),
(2) Date: Nov. 4, 2021

(87) PCT Pub. No.: WO2020/224922
PCT Pub. Date: Nov. 12, 2020

(65) Prior Publication Data
US 2022/0275916 A1    Sep. 1, 2022

(30) Foreign Application Priority Data
May 6, 2019   (DE) .................. 10 2019 111 593.0

(51) Int. Cl.
*F21S 4/28*       (2016.01)
*F21V 8/00*       (2006.01)
(52) U.S. Cl.
CPC .............. *F21S 4/28* (2016.01); *G02B 6/0045* (2013.01); *G02B 6/0091* (2013.01)
(58) Field of Classification Search
CPC ....... F21S 4/28; G02B 6/0045; G02B 6/0091; G02B 6/0028; F21V 17/104; F21V 17/16;
(Continued)

(56) References Cited

U.S. PATENT DOCUMENTS

| | | | | |
|---|---|---|---|---|
| 2012/0133994 A1* | 5/2012 | Yamasaki | .......... | H04N 1/02855 362/311.01 |
| 2014/0092444 A1* | 4/2014 | Lee | .................... | H04N 1/02835 358/474 |
| 2018/0306971 A1* | 10/2018 | Conrad | ................ | G02B 6/0035 |

FOREIGN PATENT DOCUMENTS

| | | | | |
|---|---|---|---|---|
| JP | 2012129974 A | * | 7/2012 | .............. B41J 2/471 |
| KR | 101759051 B1 | | 7/2017 | |

(Continued)

OTHER PUBLICATIONS

English Language Translation of JP2012129974A, Mounting structure of optical component, image reading apparatus having the same, and image forming apparatus having the same, Mitsuyanagi et al. (Year: 2012).*

(Continued)

*Primary Examiner* — Zheng Song
*Assistant Examiner* — Glenn Zimmerman
(74) *Attorney, Agent, or Firm* — Volpe Koenig

(57) ABSTRACT

The present invention relates to an elongate light (1) having: an elongate light carrier (2), which extends along a longitudinal axis (A), the light carrier (2) having a contact face (20) extending along the longitudinal axis (A); an elongate lighting means (3) with a main radiation direction (H), the lighting means (3) extending along the longitudinal axis (A) in order to bear against the contact face (20); an elongate light guide (4), with an end-face input region (40) facing the lighting means (3) for coupling in the light emitted by the lighting means (3), and also with an output region (41) for emitting the light coupled in via the input region (40); and a spring element (5), which is clamped in the light carrier (2) in such a way as to press the lighting means (3) against the contact face (20) and to orient the lighting means (3) in such a way that the end-face input region (40) is opposite the lighting means (3) as viewed in the main radiation direction (Continued)

(H), in order to couple light emitted in the main radiation direction (H) by the lighting means (3) into the light guide (4) via the end-face input region (40).

22 Claims, 5 Drawing Sheets

(58) Field of Classification Search
CPC .. F21V 19/003; F21V 17/164; F21Y 2115/10; F21Y 2103/10
See application file for complete search history.

(56) References Cited

FOREIGN PATENT DOCUMENTS

| | | | |
|---|---|---|---|
| WO | WO-2013134017 A1 * | 9/2013 | ........... G02B 6/0028 |
| WO | 2014069791 A1 | 5/2014 | |

OTHER PUBLICATIONS

English Language Translation of WO-2014069791-A1;Lighting Apparatus ;Choo (Year: 2014).*

* cited by examiner

FIG. 2

ELONGATE LIGHT

INVENTIVE FIELD

The present invention relates to an elongated lamp comprising an elongated lamp support which holds a lighting means that radiates into the front of a light guide of the elongated lamp.

BACKGROUND

Such elongated lamps are generally known. To achieve precise coupling of the light emitted by the lighting means into the light guide, a very time-consuming fastening of the lighting means, for example the circuit boards of LED modules, and the associated light guide is necessary. The circuit boards of such lighting means, for example, are typically screwed on or fixed in a complex and individually defined manner using terminal strips or clips. The light guide is positioned and fastened in a separate step, again in a very complex and individual manner.

It is now an object of the present invention to simplify the fastening and positioning of both lighting means and light guides with respect to the lamp support as well as relative to one another.

This object is achieved by the subject matter of the independent claim. The dependent claims further develop the central concept of the present invention in a particularly advantageous manner.

SUMMARY

According to one aspect, the present invention relates to an elongated lamp. Said lamp comprises an elongated lamp support, which extends along a longitudinal axis (i.e., a longitudinal axis of the lamp support or the elongated lamp), wherein the lamp support comprises an abutment surface extending along the longitudinal axis. The elongated lamp further comprises an elongated lighting means having a main emission direction, wherein the lighting means extends along the longitudinal axis to lie against the abutment surface. The elongated lamp further comprises an elongated light guide with a (preferably elongated) front-side input region facing the lighting means for coupling-in the light emitted by the lighting means and an output region for emitting the light coupled-in via the input region. Lastly, the elongated lamp comprises a spring element, which is clamped into the lamp support in such a way that the lighting means is pressed against the abutment surface and aligned (preferably with respect to the light guide) such that, viewed in the main emission direction, the front-side input region is opposite to the lighting means in order to couple the light emitted by the lighting means in the main emission direction into the light guide via the front-side input region.

In the context of the present invention, "elongated" is understood to mean that the extent or dimension along the longitudinal extension is preferably many times greater than the in particular transverse extensions or dimensions.

In the present case, the spring element according to the invention makes it possible to position the lighting means securely with respect to the lamp support and also align the lighting means in a defined manner relative to the light guide. It is thus possible to position the lighting means on the lamp support and relative to the light guide in a defined manner using only one more component. The assembly of such an elongated lamp can consequently be simplified significantly. Moreover, since the necessary spring element is preferably a single, integral component, the components and work steps required for assembly and alignment, and thus the overall costs for production and assembly, can be reduced significantly as well.

The releasably provided or clamped spring element can therefore selectively be inserted, removed and positioned at different locations, no matter what requirements are placed on the elongated lamp. The spring element is preferably made of a plastic. The spring element can thus particularly preferably be provided as a bulk material part. Since there is preferably only the one more component for assembly and alignment of the lighting means to the light guide, the number of needed bulk material parts can likewise be reduced and assembly simplified significantly. The tool-free assembly and disassembly of the spring element, and consequently preferably of the components assembled and aligned with said spring element, is particularly advantageous as well. Furthermore, due to the clearly defined positioning of the lighting means relative to the lamp support with the aid of the spring element, compliance with the standard for clearance and creepage distances, for example, can be ensured by the defined positioning as well.

The abutment surface extends substantially flat in one extension plane. The lighting means preferably lies flat against the abutment surface. One the one hand, this makes it possible to provide a defined abutment surface. The fact that the lighting means also lies flat against said abutment surface can further make it possible to enable the most efficient possible heat dissipation from the lighting means to the lamp support.

The spring element can comprise a positioning element having a first and a second structural portion. These are preferably formed integrally with one another. The first structural portion can cooperate with a third structural portion of the lighting means to position the lighting means relative to the spring element. The second structural portion can cooperate with a fourth structural portion of the lamp support to position the spring element and, via the first and the third structural portion, the light source can be positioned relative to the lamp support. Using the described structural portions, it is easily possible to position the elements lighting means and light guide relative to one another and then position them in a defined manner with respect to the lamp support, thus enabling an overall simple and secure fastening and positioning of the components of the elongated lamp.

In a preferred configuration, the elongated lighting means can comprise at least one through-opening, preferably as the third structural portion. Such a through-opening can, for example, be a known bore or opening in a circuit board, for example an LED module. The abutment surface can comprise a groove extending along the longitudinal axis, preferably as the fourth structural portion. Said groove is aligned with the through-opening. The spring element can comprise a projection, which, when the spring element is clamped into the lamp support, is accommodated in the groove extending through the through-opening, preferably with the second structural portion, in order to position the lighting means in a defined manner, preferably with the first structural portion, orthogonally to the groove and parallel to the extension plane. These defined structural peculiarities make it possible to provide a particularly simple, intuitive fastening option, which also enables a secure connection and clearly defined alignment of the components. In particular the use of preexisting openings, for example in an LED circuit board, enables a clearly defined alignment and positioning of the components with respect to one another.

The spring element can comprise an abutment leg with which, when the spring element is clamped into the lamp support, said spring element lies against the lighting means, preferably rests flat, such that the lighting means is pressed against the abutment surface. For this purpose, the abutment leg preferably extends parallel to the lighting means or to the abutment surface when the spring element is clamped, and then preferably rests flat against the lighting means in order to press said lighting means against the abutment surface transverse to the flat extension. A secure and effective abutment of the lighting means on the abutment surface can thus be created by means of the spring element.

The spring element can comprise a support leg with which the spring element lies against a support region of the lamp support to pretension the spring element, preferably the abutment leg, when the spring element is clamped into the lamp support in order to press the lighting means against the abutment surface. Thus, a simple structure is provided to, on the one hand, provide secure support of the spring element on the lamp support and, on the other hand, provide an effective supporting force onto the lighting means. The defined support in a defined support region of the lamp support can also make it possible to provide a desired, predefined pressing force. Damage to the lighting means by over-tightening a screw, for example, which still causes problems in the state of the art, can be thus avoided.

The abutment leg and the support leg can be elastically or resiliently connected to one another via a connecting leg. The abutment leg as a whole can also extend elastically from the support leg. In this way, any unevennesses or tolerances in the production of the lamp support can be reliably compensated. It is also possible to provide a differently defined spring force depending on the field of application, for example by varying the design of the spring element or its connecting leg. The different strength spring elements could be easily identified, for example by using different colored plastics.

The support region can preferably extend along the longitudinal axis. The support region particularly preferably faces the abutment surface. Since the surfaces face one another, the spring element can easily be clamped between them. The support region is preferably disposed offset (laterally) with respect to the main emission direction, so that the support region is not disposed in the emitting region of the lighting means or in the positioning region of the light guide. In principle, however, specifically due to the structure of the light guide, it is also conceivable that the support region can be suitably redirected. The support region can be connected to the abutment surface via a connecting web of the lamp support, which preferably extends along the longitudinal axis. Said web is preferably provided as a straight piece. The structure of the lamp support can thus be simplified, while the abutment surface and the support region are provided in a simple manner.

Viewed in the direction of the longitudinal axis, the light guide can have a straight or curved or angular cross-section, or any other cross-section. The invention is not limited here in terms of a specific configuration of the light guide, as long as its input region suitably faces the lighting means and the light can then accordingly be guided from there via the light guide to defined positions (i.e., in particular propagated by means of total reflection) where it can ultimately be decoupled via the output regions.

The output region can be disposed in a flat or curved section of the light guide. The output region itself can also be connected to the input region around a preferably curved deflection section. In principle, any shape of light guide is conceivable, and also any positioning of one or more output regions, as desired according to the circumstances. The invention is therefore not subject to any structural, geometric, dimensional or optical limits in terms of the light guide.

The elongated lamp can also comprise an optical element. This can be a diffuser, for example, or another optical element, in particular in the form of an optical disk. The optical element can preferably extend flat over the light guide; i.e., preferably at least over a flat outer side of the light guide and/or at least over its output region. In a preferred configuration, the optical element and the light guide can preferably be provided as a quasi two-layer element; either integrally or consisting of separate components. The number of optical elements and their position relative to the light guide are not limited by the present invention. In this respect, the light guide can be further optimized optically in countless ways.

The lamp support and/or the spring element can further comprise clamping regions to clamp the light guide and preferably also, if present, the optical element (laterally; i.e., lying against their flat side) and position them in a defined manner; preferably transverse to an extension surface of the light guide or the optical element or on either side relative to a direction orthogonal to the groove and parallel to the extension plane. The components are intended to be clamped and positioned in a defined manner, such that the input region is directly opposite to the lighting means in the main emission direction and thus preferably securely fixed. Displacement of the light guide, for instance, for example due to accidental impacts, can therefore reliably be avoided and damage to the lighting means can consequently be prevented as well. The clamping regions preferably extend along the longitudinal axis, and therefore preferably ensure secure positioning over the entire length.

The clamping regions can comprise a first clamping element, preferably of the lamp support. Said element preferably extends parallel to the extension plane and preferably toward the spring element. The clamping regions can also comprise a second clamping element, preferably of the spring element. The second clamping element can preferably extend parallel to the extension plane and substantially toward the first clamping element. The clamping elements that here preferably extend toward one another therefore make it possible to easily clamp the light guide and preferably also the optical element on both sides and thus position them securely. In particular the provision of the second clamping element on the spring element further facilitates the fastening and positioning of the components relative to one another. The single component of the spring element thus ensures a comprehensively secure, defined fastening and positioning of the components relative to one another.

On its abutment side facing the light guide, at least one of the clamping regions, preferably at least the second clamping element, can extend inclined with respect to the longitudinal axis such that, viewed along the longitudinal axis, said abutment side tapers from at least one of the end faces to the respective other toward the light guide, toward an abutment region of the abutment side, in order to abut the light guide. It is conceivable here that the abutment side tapers in a ramp-like or arrow-like manner. The clamping region, and therefore preferably the spring element itself, thus also provides a lead-in chamfer for inserting a light guide into the lamp support viewed along the longitudinal axis. Furthermore, if the second clamping element is provided on the spring element, it can also assist in positioning the spring element, for example, by being used as a handle part or lever for inserting and positioning the spring element.

The clamping element facing the optical element can comprise a first clamping portion for abutment with the light guide and a second clamping portion for abutment with an optical element. The optical element can preferably be clamped between the second clamping portion and the light guide. These clamping portions make it possible to provide a separate abutment surface for both the light guide and the optical element in order to position these components in a defined manner with respect to the lamp support on the one hand and relative to one another on the other and to support each one of them securely. For this purpose, for example, the light guide can project a bit further toward the abutment surface than the optical element does. The first clamping portion, which then extends transversely in front of the optical element, could also serve as a front-side abutment for the optical element, for example, and thus fulfill a dual function.

The light guide and/or the optical element can also comprise latching structures that cooperate with latching structures of the lamp support or the clamping regions to fixedly position the input region relative to the lighting means in a direction orthogonal to the abutment surface or parallel to the main emission direction. This is preferably at least at a defined distance in front of the lighting means viewed in the main emission direction. The components (light guide, optical element) can thus preferably not only be aligned in terms of their height with respect to the main emission direction. It is therefore also particularly preferably possible to define a distance of the light guide with respect to the lighting means, and consequently reliably position the components relative to one another, in order to avoid damage to the lighting means, for example, by bumping the light guide. If the light guide and the optical element are provided in a type of layered construction, it is usually sufficient to suitably fix or position one of these two components, because, due to their combined structure, the then other component is similarly aligned and positioned and fastened.

The lamp support can also comprise two abutment surfaces, preferably each having a corresponding fourth structural portion, such as in particular its groove. The abutment surfaces are preferably directed away from one another. Each abutment surface can correspondingly be associated with a lighting means, a light guide, and a spring element. In this way, an elongated lamp can be provided, which emits light laterally in the opposite direction along the longitudinal axis that is then coupled into a light guide which can be designed in any desired manner. This makes it possible to enable a lateral symmetrical emission of light with respect to the longitudinal axis.

The input regions of the light guides can preferably be connected to one another via their output region, particularly preferably integrally. The light guide of each side can thus be guided laterally outward and away from one another, for instance, and then guided downward, for example arcuately, and back toward one another to converge in the output region. This can result in an overall substantially U-shaped cross-sectional shape of the light guide, for example, the input regions of which located at the respective ends of the two legs are directed toward one another. Depending on the width of the light guide in cross-section, this shape could, for example, also be referred to as an O-shape having a slot at the top.

As already mentioned, the lighting means can be an LED module, for example. Said module can preferably comprise a circuit board, on which LEDs are provided in the form of LED chips or LED clusters. The LEDs are preferably arranged on the circuit board in series along the longitudinal axis. The lighting means can comprise a plurality of lighting means elements, preferably arranged in series. This can be a plurality of the aforementioned LED modules, for example, or also other lighting means. Known lighting means can thus be provided, which are particularly well suited for use in combination with a light guide. The spring element or at least its abutment leg can have a material thickness that is thicker than the height of the lighting means. Therefore, preferably thicker than the height of the LEDs, and particularly preferably the height of the regions of the LEDs projecting beyond the circuit board. The spring element can thus also perform a protective function for the lighting means or LEDs, because, due to the higher projection of the spring element due to its material thickness, the light guide, for example, is prevented from bumping against the lighting means or the LEDs.

The spring element, preferably the abutment leg, can comprise a recess to leave a light emitting region of the lighting means, preferably the LEDs, open. This makes it possible to provide a particularly large abutment surface of the spring element without impairing the light emission of the lighting means or damaging individual lighting means.

The lamp support is preferably produced as an extruded profile and preferably as an aluminum extruded profile. In principle, the lamp support can be made of any material. It is in particular made of a metal, and particularly preferably of aluminum. Manufacturing options other than extrusion are conceivable too. Extrusion in particular has the advantage that, for example, the abutment surface, the fourth structural portion, in particular the groove, the support region, the connecting web, the first clamping element, and/or the second clamping element can be easily be produced as an extruded contour of the extruded profile. Using known production methods of such lamp supports, it is thus possible to provide a corresponding contour and structure in a simple manner, so that the provision of the additional simple securing function by means of the spring element does not require any additional effort.

BRIEF DESCRIPTION OF THE DRAWINGS

Further advantages and configurations of the present invention will be described in the following on the basis of the figures of the accompanying drawings. The figures show.

DETAILED DESCRIPTION OF THE PREFERRED EMBODIMENTS

Figure 1:
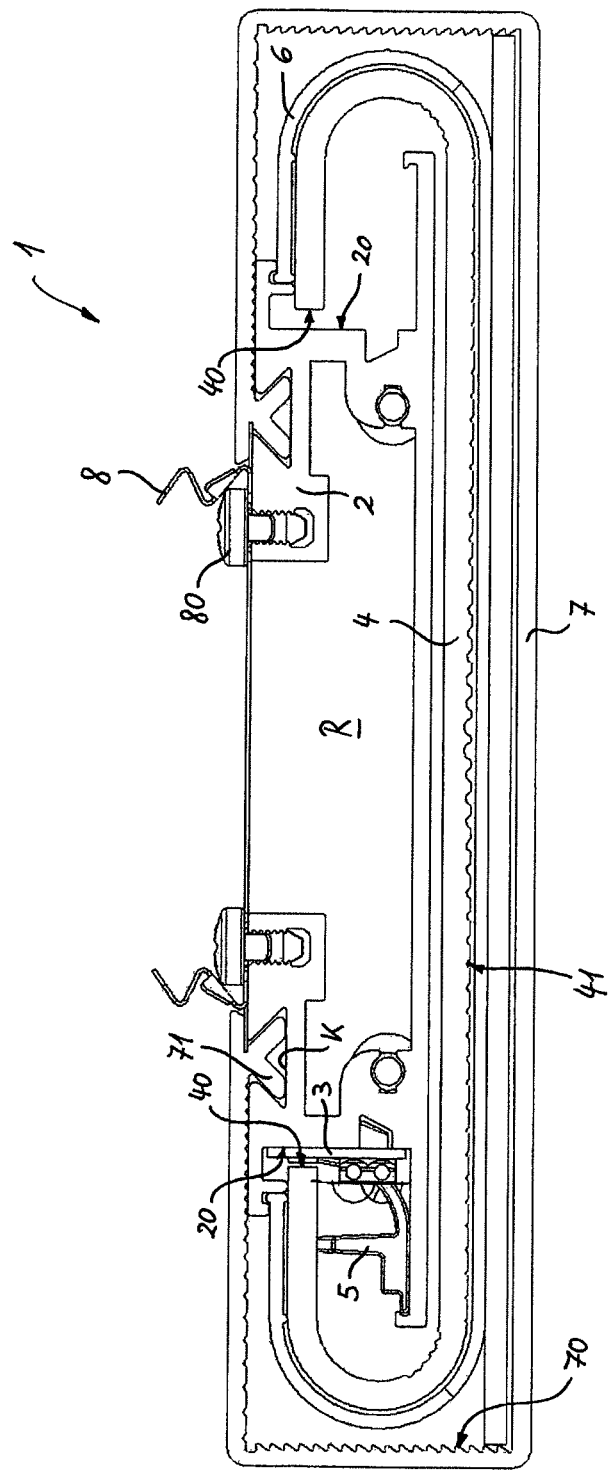
FIG. 1 a lateral cross-sectional view of an elongated lamp according to the present invention, FIG. 2 a detail view of the elongated lamp according to FIG. 1, FIG. 3 a perspective partial sectional view of the elongated lamp according to FIG. 1 without lighting means and spring element, FIG. 4 a lamp support with lighting means and spring element of an elongated lamp according to FIG. 1 in a perspective illustration, and FIG. 5 a further perspective illustration of the components according to FIG. 4.
Figure 2:
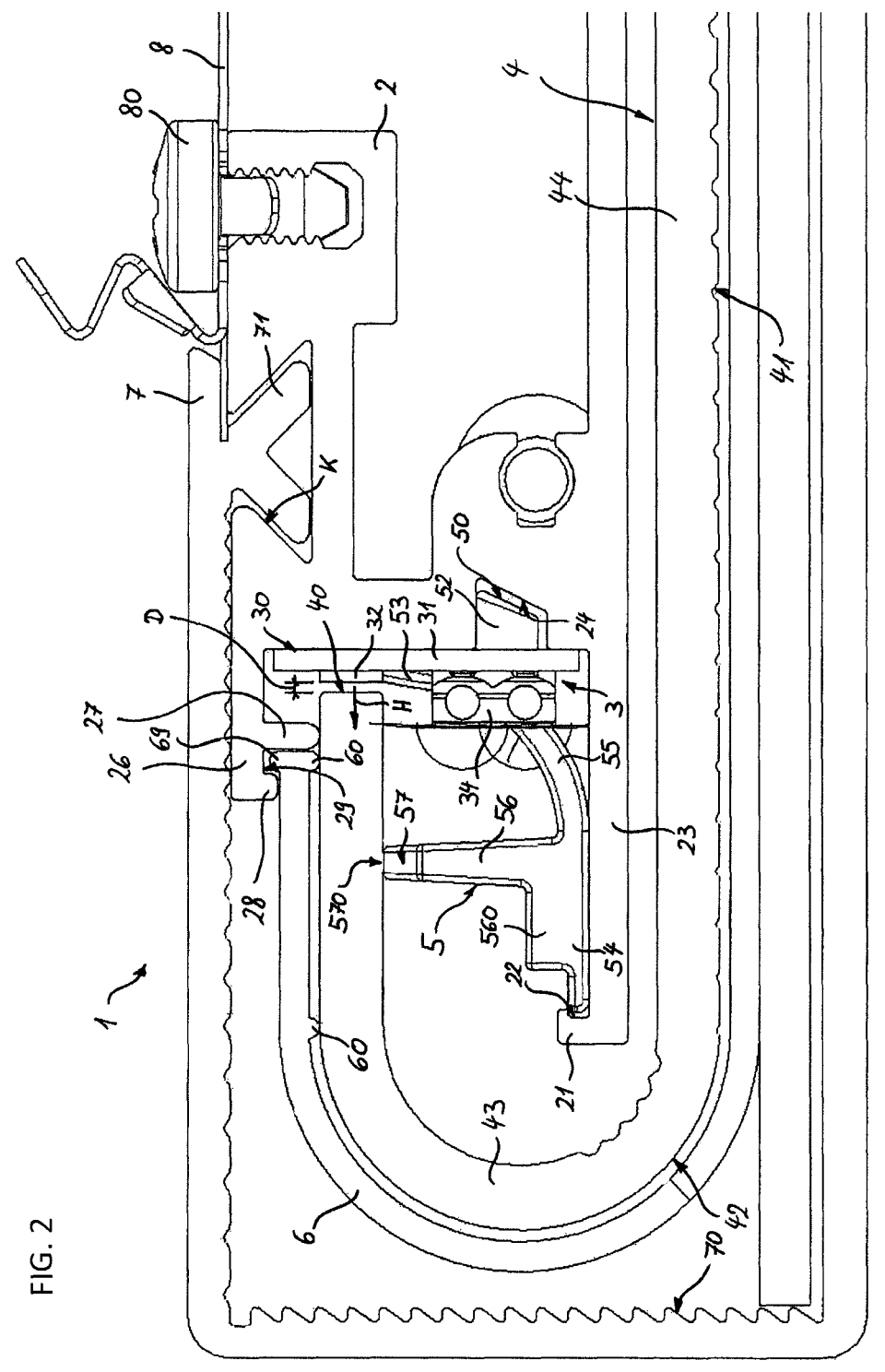
Figure 3:
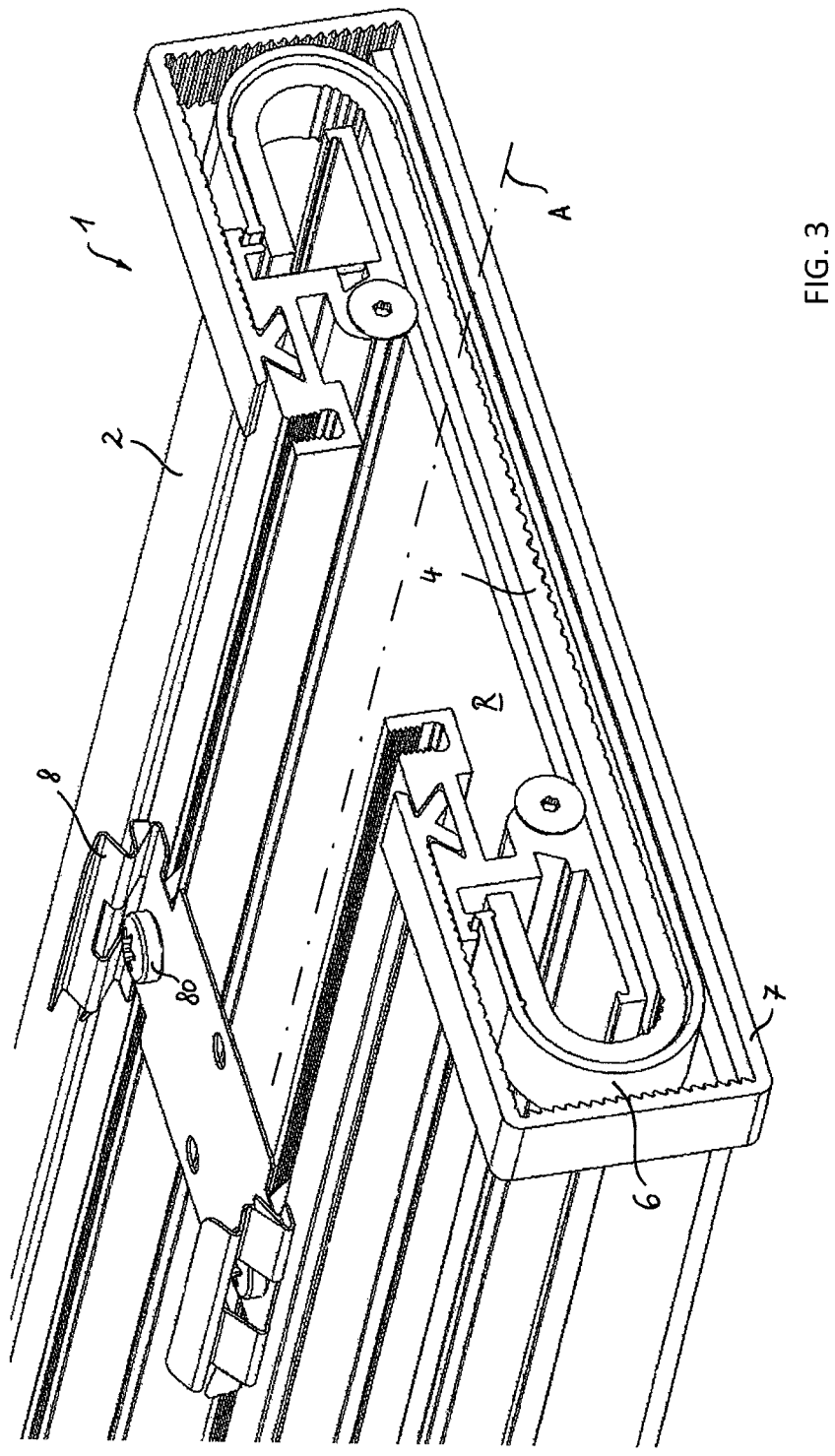
Figure 4:
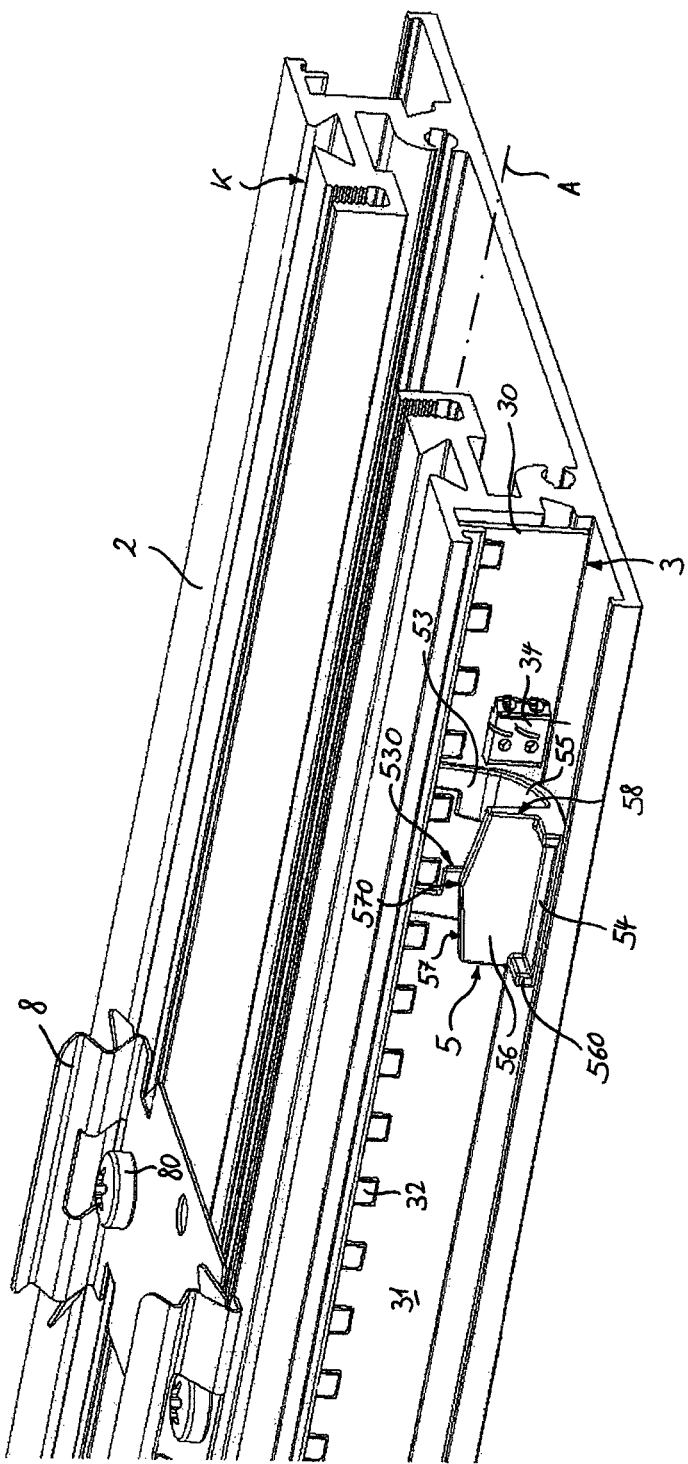
Figure 5:
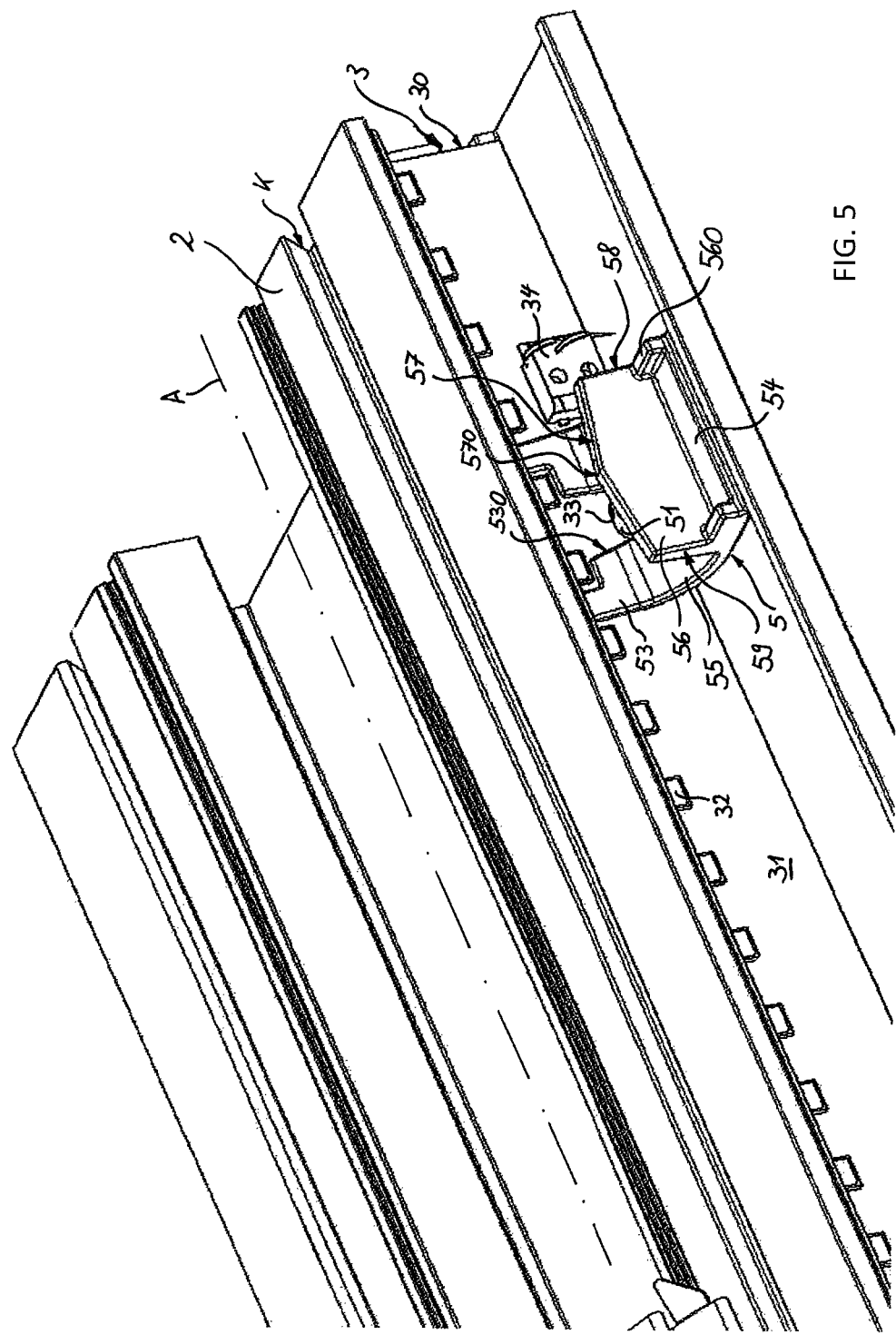

FIGS. 1 to 3 show different views of an elongated lamp 1 according to the invention according to the present invention and FIGS. 4 and 5 show individual components thereof.

The elongated lamp 1 comprises an elongated lamp support 2. Said lamp support extends along a longitudinal axis A, which here also forms the longitudinal axis A of the elongated lamp 1. The lamp support 2 is preferably made of a metal, for example aluminum. The lamp support 2 is particularly preferably produced as an extruded profile.

The lamp support 2 comprises an abutment surface 20 extending along the longitudinal axis A. In the design example shown here, the lamp support 2 comprises two abutment surfaces 20, which here are preferably directed away from one another. The abutment surfaces 20 preferably extend substantially flat in one extension plane. Other configurations and structures of the abutment surface 20 are in principle conceivable as well, for example a step-shaped form, etc.

The elongated lamp 1 further comprises an elongated lighting means 3 with a main emission direction H—here transverse to the longitudinal extension. The lighting means 3 extends along the longitudinal axis A to lie against the abutment surface and preferably lie flat against the abutment surface. The main emission direction H here is directed away from the abutment surface 20 in the opposite direction. As shown in the design example, the lighting means 3 is preferably an LED module 30. Said LED module can comprise a circuit board 31, for example, and, in this case, a plurality of LEDs 32. The LEDs 32 here are arranged in series along the longitudinal axis A. As shown here, the LED module 30 can also comprise further components, for example a terminal 34 for connecting external cables to operate the lighting means 3. The lighting means 3 can comprise a plurality of lighting means elements, such as the LED module 30, preferably arranged in series. These can be operated independently or can also be interconnected, for example.

The elongated lamp 1 also comprises an elongated light guide 4. The light guide 4 comprises a here elongated front-side input region 40 facing the lighting means 3, for coupling-in the light emitted by the lighting means 3 in particular in the main emission direction H. The light guide 4 furthermore comprises an output region 41 for emitting the light coupled-in via the input region 40 to the outside; i.e., out of the light guide 4 and preferably to the outside for emitting light or lamp radiation. The light guide 4 can be configured as a single piece or also in multiple pieces with respect to the longitudinal axis A. Viewed in the direction of the longitudinal axis A, the light guide 4 can have a straight or curved, as shown, or even angular or otherwise shaped cross-section. The output region 41 can be disposed in a flat section 44 of the light guide 4 as shown. It is also conceivable to dispose the output region 41 in a curved section 43 or an angular section or another section of the light guide 4, wherever light outcoupling is desired. As shown here, the output region 41 is preferably connected to the input region 40 via a here curved deflection section 43. In the preferred design example shown here with two abutment surfaces 20 and correspondingly associated lighting means 3, two light guides 4 or light guide sections, respectively comprising an input region 40, are preferably accordingly provided as well. Viewed in the main emission direction H, these both extend from the abutment surface 20 laterally outward away from one another and are brought together toward the common output region 41 via respective deflection sections 43. The input regions 40 of the light guide 4 are therefore integrally connected to one another here via their output region 41. Thus, an integral light guide 4 is provided, which here has a substantially U-shaped configuration. The upper ends of the U-legs are directed inward toward one another in order to turn the input regions 40 toward the lighting means 3 to be able to couple the light emitted by them into the light guide. Due to the overall elongated configuration of the individual components, the light guide 4 can be pushed longitudinally along the longitudinal axis A onto the lamp support 2. Because of the U-shape shown here, the light guide 4 surrounds the lamp support 2 on its underside and consequently conceals it visually, which results in an overall attractive appearance.

The elongated lamp 1 also comprises a spring element 5. The spring element is preferably made of a plastic. The spring element 5, is configured and clamped into the lamp support 2 in such a way that the lighting means 3 is pressed against the abutment surface 20 and in particular aligned with respect to the light guide 4 such that, viewed in the main emission direction H, the front-side input region 40 is opposite to the lighting means 3 in order to couple the light emitted by the lighting means 3 in the main emission direction H into the light guide 4 via the front-side input region 40.

For this purpose, the spring element 5 preferably comprises a positioning element 50 having a first structural portion 51 and a second structural portion 52. The first and second structural portions 51, 52 are preferably formed integrally with one another. In the design example shown here, the positioning element 50 is provided as a pin-like projection of the spring element 5, for example. As can in particular be seen in FIG. 2, the first structural portion 51 cooperates with a third structural portion 33 of the lighting means 3. This third structural portion 33 can, for example, be a, in this case circular, through-opening in the lighting means 3 or the circuit board 31 thereof, through which the positioning element 50 extends. The positioning pin 50 accommodated in the through-opening 33 thus acts to position the lighting means 3. As a result, the lighting means 3 can be positioned relative to the spring element 5. The second structural portion 52, which is formed here by a distal end of the positioning element 50, can then cooperate with a fourth structural portion 24 of the lamp support 2. In the design example shown, the fourth structural portion 24 is formed as a groove of the lamp support 2 extending along the longitudinal axis A, whereby the groove 24 is preferably provided as an extruded contour of the lamp support 2 produced as an extruded profile. The through-opening 33 here is aligned with the groove 24. Therefore, the positioning element with the second structural element 52 can project into the groove 24. In this way, the spring element 5 and, via the first and the third structural portion 51, 33, the lighting means 3 can be positioned relative to the lamp support 2. This is simple to do because, when the spring element 5 is clamped into the lamp support 2, the positioning element or the projection 50 is accommodated in the groove 24 extending through the previously described through-opening 33, preferably with the second structural portion 52, specifically to position the lighting means 3 in a defined manner, preferably with the first structural portion 51, orthogonally to the groove 24 and parallel to the extension plane.

As shown, the spring element 5 can comprise an abutment leg 53. When the spring element 5 is clamped into the lamp support 2, the spring element can preferably lie against the lighting means 3 with the abutment leg 53 such that the lighting means 3 is pressed against the abutment surface 20, as can be clearly seen in FIG. 2, for example.

The spring element 5 can also comprise a support leg 54 with which the spring element 5 lies against a support region 21 of the lamp support 2 to pretension the spring element 5, and here in particular the abutment leg 53, when the spring element 5 is clamped into the lamp support 2 in order to press the lighting means 3 against the abutment surface 20.

As can be seen in FIGS. 2 and 4, for example, the abutment leg 53 and the support leg 54 can be connected to one another via a connecting leg 55, for example. Said connecting leg is preferably elastic or resilient specifically in order to be able to provide the pretensioning of the spring element 5 on the lighting means 3 for abutment with the abutment surface 20.

The aforementioned support region 21 can preferably extend along the longitudinal axis A. As shown here, the support region 21 can face the abutment surface 20. As shown, the support region is offset downward with respect to the main emission direction H of the lighting means 3 here, so that, viewed in the main emission direction H, the area in front of the lighting means 3 is open for the arrangement of the light guide 4. To hold the spring element 5 securely in the lamp support 2, in particular in the clamped state, the support region 21 can have an undercut 22 as shown here.

As can be seen FIG. 2, for example, the support region 21 can be connected to the abutment surface 20 via a connecting web 23 of the lamp support 2, which preferably extends along the longitudinal axis A. Said connecting web is preferably likewise flat. The support region 21, the connecting web 23 and the abutment surface 20 can thus provide and/or delimit a space, or, in this case, substantially triangular legs, for the secure accommodation of the spring element 5.

The spring element 5, or at least its abutment leg 53, preferably have a material thickness that is thicker than the height of the lighting means 3 and preferably thicker than the height of the LEDs 32, and particularly preferably the height of the regions of the LEDs 32 projecting beyond the circuit board 31. The spring element 5 can thus also serve as protection of the lighting means 3 or the LEDs 32 against mechanical influences, for example originating from the light guide 4.

As can be clearly seen in FIGS. 4 and 5, for example, the spring element 5, and preferably its abutment leg 53, can comprise a recess 530 to leave a light emitting region of the lighting means 3, preferably the LEDs 32, open here. In particular in combination with a through-opening 33 in the circuit board 31, for example, and inserting the positioning element 50 of the spring element 5, a defined alignment specifically of this recess 530 can automatically be made possible with the specific intent not to obstruct the light emitting region of the lighting means 3 and also not damage the lighting means 3 or the LEDs 32.

As can in particular be seen in FIGS. 1 to 3, the elongated lamp 1 can further comprise an optical element 6, such as here for example a diffuser or any other optical element. This optical element 6 can preferably extend flat over the light guide 4 as shown here. In the design example shown, the optical element 6 extends substantially over the entire surface of a flat outer side 42 of the light guide 4 and in particular at least over its output region 41. The optical element 6 can preferably be disposed at a defined distance from the light guide 4. For this purpose, the optical element 6 can comprise defined spacing structures 60, for example, which project toward and abut the light guide 4. Like the light guide 4, the optical element 6 can also have an elongated shape and preferably extend along the longitudinal axis A.

At this point, it should be noted that, in the context of the present invention, "extending along the longitudinal axis" focuses in particular on the extension direction and is not intended to limit the length/dimension of the extension; it can mean over the entire length of the component comprising the longitudinal axis A, here preferably the lamp support 2 or the elongated lamp 1 per se, and also a smaller or larger extension.

As shown, both the lamp support 2 and the spring element 5 can comprise clamping regions 26, 56. However, it is also conceivable that only one of these two components accordingly comprises the clamping regions. The clamping regions 26, 56 serve to clamp and position the light guide 4 and preferably also, if present, the optical element 6 (on both sides) in a defined manner. The intent is to preferably enable defined positioning in particular transverse to an extension surface of the light guide 4 or the optical element 6, or on both sides with respect to a direction orthogonal to the groove or the fourth structural portion 24 and parallel to the extension plane. The clamping regions 26, 56 are intended to clamp and position the light guide 4 and preferably also the optical element 6 in a defined manner such that the input region 40 is directly opposite to the lighting means 3 in the main emission direction H, i.e., in particular securely fixed and defined. The clamping regions 26, 56 preferably likewise extend along the longitudinal axis A. Thus, a simple alignment and positioning is created for the light guide 4 and the optical element 6 as well.

As can in particular be seen in FIG. 2, the clamping regions can preferably comprise a first clamping element 26, here of the lamp support 2, which preferably extends parallel to the extension plane and preferably toward the spring element 5. The clamping regions can also comprise a second clamping element 56, preferably of the spring element 5, which preferably extends parallel to the extension plane and substantially toward the first clamping element 26, in order to clamp the light guide 4 and preferably also the optical element 6 on both sides, as can in particular clearly be seen in FIGS. 1 and 2.

On its abutment side 57 facing the light guide 4, at least one of the clamping regions, preferably at least the second clamping element 56, can extend inclined with respect to the longitudinal axis A such that, viewed along the longitudinal axis A, said abutment side 57 tapers from at least one of its end faces 58, 59 to the respective other toward the light guide, toward an abutment region 570 of the abutment side 57, in order to abut the light guide 4. As shown here, and in particular clearly visible in FIGS. 4 and 5, the abutment side 57 can taper toward the abutment region 570 in an arrow-like manner. Other shapes, such as ramp-like taper, are conceivable as well. The intent is therefore in particular to provide a lead-in chamfer, viewed in the direction of the longitudinal axis A, for inserting the light guide 4 as can be seen in FIG. 2, for example.

The second clamping element 56 here is preferably integrally formed with the spring element 5. It preferably extends upward from the support leg 54, i.e., in particular perpendicular to the support leg 54 or parallel to the abutment leg 53 or parallel to the abutment surface 20. In order to make the clamping element 56 as stable as possible, the spring element 5 can comprise reinforcing struts 560 with which the clamping element 56 here is connected to the support leg 54. In this case, the clamping element 56 preferably extends such that it can also serve as a "handle" for handling (e.g. inserting, positioning, removing) the spring element 5.

The clamping element 26 facing the optical element 6 can comprise a first clamping portion 27 for abutment with the light guide 4. This clamping element 26 can also comprise a second clamping portion 28 for abutment with the optical element 6. The optical element 6 is preferably clamped between the second clamping portion 28 and the light guide 4, as can be clearly seen in FIG. 2, for example. As shown in the figures, the first clamping portion 27 can cooperate with an end face of the optical element 6, for example, in order to position it in a defined manner. One of the clamping elements, here the clamping element 26 facing the optical element and in particular the second clamping portion 28, can furthermore provide an undercut 29, which cooperates with a structural element belonging to the optical element 6 and here preferably extending along a longitudinal axis A and optionally additionally or alternatively belonging to the light guide 4, in order to hold specifically this element securely in place in the lamp support 2. The light guide 4 and/or the optical element 6 can therefore specifically comprise corresponding latching structures 69 that cooperate with latching structures 29, such as the undercut 29, of the lamp support 2 or also the clamping regions (here 26) to fixedly position the input region 40 relative to the lighting means 3 in a direction orthogonal to the abutment surface 20 or parallel to the main emission direction H, preferably at least at a defined distance D in front of the lighting means 3 viewed in the main emission direction H.

The lamp 1 can also comprise a cover 7. This cover is preferably likewise configured as an elongated component and preferably has a cross-section to enclose the optical components (in particular the light guide 4, the optical element 6, the lighting means 3) together with the lamp support 2. The cover 7 is preferably accommodated with holding structures 71 in corresponding holding structures K (e.g. extruded contours) of the lamp support 2; here preferably pushed onto the lamp support 2 in longitudinal axis A via the holding structures K. The cover 7 can preferably comprise light-influencing structures 70.

The lamp 1 can also comprise holding elements 8 for fastening the lamp 1. The holding elements 8 are configured here in the form of a spring clip, which is fastened to the lamp support 2 here by means of screws 80.

In the lamp support 2, and here preferably in its center and further preferably surrounded by the other components, a space R is provided, which preferably comprises electrical or electronic components for operating the lamp 1, such as, for example, cables and/or converters and the like.

The present invention is not limited by the aforementioned design examples, provided it is covered by the subject matter of the following claims. In particular, the configuration and shape of the individual elements is not limited by the present invention. For example, the lighting means 3 are shown here at two positions with opposite main emission directions H and respectively radiate light in a light guide or a light guide section via the respective input regions 40 into this light guide 4, which here is integrally formed, whereby the spring elements 5 correspondingly clamp the lighting means 3 on each side and for this purpose position the light guide 4 and align all of the components together. In principle, it is conceivable that any number of lighting means 3 and light guides 4 are accordingly provided, whereby the light guide 4 can be configured with separate sections/elements or, as here, integrally. The integral configuration shown here, in particular, has the advantage that a harmonious appearance of the lamp 1 as a whole is provided and the emission of light is as homogeneous as possible. The number, type and arrangement of the lighting means 3 are of course likewise not limited by the present invention. Neither, ultimately, is the design of the spring element 5, provided that it enables its task of positioning the lighting means 3 relative to the light guide 4 on the one hand and, on the other hand, in cooperation with the lamp support 2.

The invention claimed is:

1. An elongated lamp comprising:
   an elongated lamp support which extends along a longitudinal axis, wherein the lamp support comprises an abutment surface extending along the longitudinal axis,
   an elongated light source having a main emission direction, wherein the light source extends along the longitudinal axis to lie against the abutment surface,
   an elongated light guide with a front-side input region facing the lighting source for coupling-in the light emitted by the light source and an output region for emitting the light coupled-in via the input region,
   a spring element, which is clamped into the lamp support in such a way that the light source is pressed against the abutment surface and aligned such that, viewed in the main emission direction, the front-side input region is opposite to the light source in order to couple the light emitted by the light source in the main emission direction into the light guide via the front-side input region and
   an optical element, which extends flat over the light guide, over at least one of: a flat outer side of the light guide or its output region, wherein at least one of: the lamp support or the spring element comprise clamping regions to clamp the optical element and the light guide and position them in a defined manner, transverse to an extension surface of the light guide or the optical element or on either side relative to a direction orthogonal to a groove and parallel to an extension plane, so that the input region is directly opposite to the light source in the main emission direction, and wherein the clamping regions extend along the longitudinal axis, the clamping regions comprising a first clamping element, of the lamp support, which extends parallel to the extension plane and toward the spring element, and a second clamping element, of the spring element, which extends parallel to the extension plane and substantially toward the first clamping element, to clamp the light guide and the optical element on both sides.

2. The elongated lamp according to claim 1, wherein the abutment surface extends substantially flat in one extension plane, and wherein the light source lies flat against the abutment surface.

3. The elongated lamp according to claim 1, wherein the spring element comprises a positioning element having a first and a second structural portion, which are formed integrally with one another, wherein the first structural portion cooperates with a third structural portion of the light source to position the light source relative to the spring element, and wherein the second structural portion cooperates with a fourth structural portion of the lamp support to position the spring element and, via the first and the third structural portion, position the light source relative to the lamp support.

4. The elongated lamp according to claim 1, wherein the spring element comprises an abutment leg with which, when the spring element is clamped into the lamp support, said spring element lies flat against the light source, such that the light source is pressed against the abutment surface.

5. The elongated lamp according to claim 1 wherein, viewed in the direction of the longitudinal axis, the light guide has a straight or curved or angular cross-section.

6. The elongated lamp according to claim 1, wherein the output region is at least one of: disposed in a flat or curved section of the light guide; or is connected to the input region via a curved deflection section.

7. The elongated lamp according to claim 1, wherein the second clamping element, comprises an abutment side facing the light guide, which extends inclined with respect to the longitudinal axis such that, viewed along the longitudinal axis, said abutment side tapers, in a ramp or arrow manner, from at least one of its end faces to the respective other toward the light guide, toward an abutment region of the abutment side, in order to abut the light guide.

8. The elongated lamp according to claim 1, wherein the clamping element facing the optical element comprises a first clamping portion for abutment with the light guide and a second clamping portion for abutment with the optical element, wherein the optical element is clamped between the second clamping portion and the light guide.

9. The elongated lamp according to claim 1, wherein the light source comprises at least one of: an LED module, comprising LEDs on a circuit board, arranged in series along the longitudinal axis, or a plurality of lighting elements, arranged in series.

10. The elongated lamp according to claim 1, wherein the light source comprises an LED module, comprising LEDs on a circuit board, and wherein the spring element, at least an abutment leg, has a material thickness that is thicker than a height of the light source, the LEDs, and thicker than a height of regions of the LEDs projecting beyond the circuit board.

11. The elongated lamp according to claim 3, wherein the elongated light source comprise at least one through-opening, as the third structural portion,
wherein the abutment surface comprises a groove which extends along the longitudinal axis, as the fourth structural portion, and is aligned with the through-opening, and
wherein the spring element comprises the positioning element, which, when the spring element is clamped into the lamp support, is accommodated in the groove extending through the through-opening, with the second structural portion, in order to position the light source in a defined manner, with the first structural portion, orthogonally to the groove and parallel to the extension plane.

12. The elongated lamp according to claim 3, wherein the lamp support comprises two abutment surfaces, each comprising a corresponding fourth structural portion, wherein the abutment surfaces are directed away from one another, wherein each abutment surface is accordingly associated with a light source, a light guide and a spring element.

13. The elongated lamp according to claim 4, wherein the spring element comprises a support leg with which said spring element lies against a support region of the lamp support to pretension the abutment leg, when the spring element is clamped into the lamp support in order to press the light source against the abutment surface.

14. The elongated lamp according to claim 12, wherein input regions of the light guide are integrally connected to one another, via their output region.

15. The elongated lamp according to claim 12, wherein the lamp support is produced as an aluminum extruded profile,
wherein the abutment surface, the fourth structural portion, a support region a connecting web, at least one of: the first clamping element, or a second clamping element are produced as an extruded contour of the extruded profile.

16. The elongated lamp according to claim 13, wherein the abutment leg and the support leg are elastically connected to one another via a connecting leg.

17. The elongated lamp according to claim 13, wherein the support region at least one of:
extends along the longitudinal axis;
faces the abutment surface; or is connected to the abutment surface via a connecting web of the lamp support, which extends along the longitudinal axis.

18. An elongated lamp comprising:
an elongated lamp support which extends along a longitudinal axis, wherein the lamp support comprises an abutment surface extending along the longitudinal axis,
an elongated light source having a main emission direction, wherein the light source extends along the longitudinal axis to lie against the abutment surface,
an elongated light guide with a front-side input region facing the lighting source for coupling-in the light emitted by the light source and an output region for emitting the light coupled-in via the input region, and
a spring element, which is clamped into the lamp support in such a way that the light source is pressed against the abutment surface and aligned such that, viewed in the main emission direction, the front-side input region is opposite to the light source in order to couple the light emitted by the light source in the main emission direction into the light guide via the front-side input region, wherein at least one of: the light guide or the optical element comprises latching structures that cooperate with latching structures of the lamp support or clamping regions to fixedly position the input region relative to the light source in a direction orthogonal to the abutment surface or parallel to the main emission direction, at least at a defined distance in front of the light source viewed in the main emission direction.

19. The elongated lamp according to claim 18, further comprising an optical element, which extends flat over the light guide, over at least one of: a flat outer side of the light guide or its output region.

20. The elongated lamp according to claim 18, wherein at least one of: the lamp support or the spring element comprise clamping regions to clamp the optical element and the light guide and position them in a defined manner, transverse to an extension surface of the light guide or the optical element or on either side relative to a direction orthogonal to a groove and parallel to an extension plane, so that the input region is directly opposite to the light source in the main emission direction,
wherein the clamping regions extend along the longitudinal axis.

21. The elongated lamp according to claim 18, wherein the clamping regions comprise a first clamping element, of the lamp support, which extends parallel to the extension plane and toward the spring element, and a second clamping element, of the spring element, which extends parallel to the extension plane and substantially toward the first clamping element, to clamp the light guide and the optical element on both sides.

22. An elongated lamp comprising:
an elongated lamp support which extends along a longitudinal axis, wherein the lamp support comprises an abutment surface extending along the longitudinal axis,
an elongated light source having a main emission direction, wherein the light source extends along the longitudinal axis to lie against the abutment surface,
an elongated light guide with a front-side input region facing the lighting source for coupling-in the light emitted by the light source and an output region for emitting the light coupled-in via the input region, and a spring element, which is clamped into the lamp support in such a way that the light source is pressed against the abutment surface and aligned such that, viewed in the main emission direction, the front-side input region is opposite to the light source in order to couple the light emitted by the light source in the main emission direction into the light guide via the front-side input region, wherein the spring element comprises an abutment leg with which, when the spring element is clamped into the lamp support, said spring element lies flat against the light source, such that the light source is pressed against the abutment surface, wherein the light source comprises an LED module, comprising LEDs on a circuit board, and wherein the abutment leg, comprises a recess in order to leave a light emitting region of the LEDs open.

* * * * *